United States Patent
Manhart et al.

(10) Patent No.: US 11,308,664 B2
(45) Date of Patent: Apr. 19, 2022

(54) METHOD FOR RECONSTRUCTING A THREE-DIMENSIONAL IMAGE DATA SET

(71) Applicant: Siemens Healthcare GmbH, Erlangen (DE)

(72) Inventors: Michael Manhart, Fürth (DE); Yixing Huang, Erlangen (DE); Alexander Preuhs, Munich (DE); Günter Lauritsch, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 177 days.

(21) Appl. No.: 16/654,312

(22) Filed: Oct. 16, 2019

(65) Prior Publication Data

US 2020/0126273 A1  Apr. 23, 2020

(30) Foreign Application Priority Data

Oct. 17, 2018 (EP) .................... 18200946

(51) Int. Cl.
   *G06K 9/00* (2006.01)
   *G06T 11/00* (2006.01)
   *G06T 5/50* (2006.01)

(52) U.S. Cl.
   CPC .......... *G06T 11/008* (2013.01); *G06T 5/50* (2013.01); *G06T 11/006* (2013.01);
   (Continued)

(58) Field of Classification Search
   CPC ....... G06T 11/008; G06T 5/50; G06T 11/006; G06T 2207/10116; G06T 2207/20081;
   (Continued)

(56) References Cited

U.S. PATENT DOCUMENTS

| | | | |
|---|---|---|---|
| 2006/0002509 A1* | 1/2006 | Claus | G06T 11/008 378/21 |
| 2011/0293159 A1* | 12/2011 | Bruder | G06T 11/006 382/131 |

(Continued)

OTHER PUBLICATIONS

Heußer, Thorsten, et al. "Prior-based artifact correction (PBAC) in computed tomography." Medical physics 41.2 (2014): 021906-1-021906-16.

(Continued)

*Primary Examiner* — Van D Huynh

(74) *Attorney, Agent, or Firm* — Lempia Summerfield Katz LLC

(57) ABSTRACT

Systems and methods are provided for reconstructing a three-dimensional result image data set from computed tomography from a plurality of two-dimensional images that create an image of an object undergoing examination from a particular imaging angle, The imaging angles of all the images lie within a restricted angular range. A three-dimensional artifact-reduced image data set is provided based on the two-dimensional images using an algorithm for reducing artifacts that are the result of a restriction of the angular range. The result image data set is reconstructed using a reconstruction algorithm that processes both the artifact-reduced image data set and the two-dimensional images as input data.

20 Claims, 4 Drawing Sheets

(52) U.S. Cl.
CPC ............... *G06T 2207/10116* (2013.01); *G06T 2207/20081* (2013.01); *G06T 2207/20084* (2013.01); *G06T 2207/20224* (2013.01); *G06T 2207/30004* (2013.01); *G06T 2211/421* (2013.01); *G06T 2211/424* (2013.01)

(58) Field of Classification Search
CPC . G06T 2207/20084; G06T 2207/20224; G06T 2211/30004; G06T 2211/421; G06T 2211/424; G06T 2211/436
USPC ........................................................ 382/130
See application file for complete search history.

(56) References Cited

U.S. PATENT DOCUMENTS

| | | | | |
|---|---|---|---|---|
| 2012/0177267 | A1* | 7/2012 | Chen ................... | A61B 6/5258 382/131 |
| 2013/0136333 | A1* | 5/2013 | Dennerlein .............. | G06K 9/00 382/132 |
| 2014/0313196 | A1* | 10/2014 | Mistretta ................ | A61B 6/504 345/424 |
| 2015/0078507 | A1* | 3/2015 | Kyriakou ............. | A61B 6/4085 378/4 |
| 2015/0178917 | A1* | 6/2015 | Yang ...................... | A61B 6/032 382/131 |
| 2016/0078647 | A1* | 3/2016 | Schildkraut ........... | G06T 11/005 382/131 |
| 2020/0090384 | A1* | 3/2020 | Atria ......................... | G06T 7/97 |

OTHER PUBLICATIONS

Summons under Rule 115(1) EPC for European Application No. 18 200 946.4-1210 dated Nov. 25, 2020.

Chen, Guang-Hong, Jie Tang, and Shuai Leng. "Prior image constrained compressed sensing (PICCS): a method to accurately reconstruct dynamic CT images from highly undersampled projection data sets." Medical physics 35.2 (2008): 660-663.

European Search Report for European Patent Application No. 18200946.4-1210 dated Apr. 5, 2019.

Gu, Jawook, and Jong Chui Ye. "Multi-scale wavelet domain residual learning for limited-angle CT reconstruction." arXiv preprint arXiv:1703.01382 (2017).

Szegedy, Christian, et al. "Intriguing properties of neural networks." arXiv preprint arXiv:1312.6199 (2014).

* cited by examiner

METHOD FOR RECONSTRUCTING A THREE-DIMENSIONAL IMAGE DATA SET

CROSS REFERENCE TO RELATED APPLICATIONS

This application claims the benefit of EP18200946.4, filed on Oct. 17, 2018, which is hereby incorporated by reference in its entirety.

FIELD

Embodiments relate to a method for reconstructing a three-dimensional result image data set from a plurality of two-dimensional images that create an image of an object undergoing examination from a particular imaging angle. The imaging angles of all the images lie within a restricted angular range.

BACKGROUND

In the field of computed tomography, but also in other application areas of medical imaging, the reconstruction of three-dimensional volume data sets from a plurality of two-dimensional images is frequently desired. For example, for generating a computed tomograph, an X-ray source and an X-ray detector may be rotated together about an axis to create an image of an object undergoing examination, for example a patient to be examined, from different imaging angles. If images are captured for a sufficiently large number of imaging angles distributed over a sufficiently large angular range, then three-dimensional image data sets of high quality may be reconstructed.

In some applications, for example, if a C-arm is to be utilized for capturing images, or if the available angles of capture are restricted for other reasons, for example if imaging is to be performed in tandem with a medical procedure, then when three-dimensional image data sets are reconstructed from the images captured in the restricted angular range severe artifacts may result that make it difficult or even impossible to evaluate the resulting image data set. Such artifacts are particularly pronounced if relatively simple reconstruction algorithms, for example filtered back projection, are used. However, as may be seen for example from the publication by J. Gu et al., "Multi-Scale Wavelet Domain Residual Learning for Limited-Angle CT Reconstruction", arXiv:1703.01382v1 [cs.CV], 4 Mar. 2017, even with more processing-intensive iterative reconstruction methods, large-area artifacts that result from a restricted angular range of the imaging angles cannot be removed from the reconstructed image data set, however. For this reason, this reference proposes utilizing a machine learning method to identify such artifacts and to remove the artifacts from the reconstructed image data set.

Although this approach may achieve very good suppression of artifacts, when machine learning methods are utilized it is problematic that, under certain conditions, even small distortions to the image—for example noise patterns that are barely perceptible with the naked eye—may result in unexpected behavior of the algorithm. This problem is discussed for example in the publication by C. Szegedy et al., "Intriguing properties of neural networks", arXiv: 1312.6199v4 [cs.CV], 19 Feb. 2014. This property of algorithms that have been trained by machine learning may in some conditions result in even small distortions to the image—for example image noise, that is never completely avoidable—resulting in a potential misclassification of a feature that is actually present as an artifact, and consequently when machine learning methods are utilized for artifact reduction it is not possible to rule out the possibility that even large-area or clearly identifiable features are misclassified as artifacts and removed.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a way of reconstructing three-dimensional image data sets from images that may be captured in particular over a restricted angular range. Image artifacts resulting therefrom are to be avoided or at least reduced to a large extent, while at the same time avoiding the discarding of features that are actually present in the image data of the images.

A method is provided that includes the following steps. A three-dimensional artifact-reduced image data set in dependence on the two-dimensional images is provided. In the context of this provision, the two-dimensional images or a processing result that is dependent on the two-dimensional images are processed by an algorithm, for example, an algorithm for reducing artifacts that are the result of the restriction of an angular range. The result image data set is reconstructed using a reconstruction algorithm that processes both the artifact-reduced image data set or processing data that is generated from the artifact-reduced image data set, and also the two-dimensional images as input data.

Embodiments are based on an idea of not directly utilizing an algorithm to reduce artifacts in order to provide a result image data set of a reconstruction. Instead, embodiments provide an artifact-reduced image data set that has been determined using this algorithm may be utilized as additional information, that is utilized in the course of reconstruction in addition to the two-dimensional images. As a result, by taking into account the actual image data of the two-dimensional images it is possible to provide that features imaged there are not inadvertently discarded; at the same time, however, utilization of the artifact-reduced image data set as additional information makes it possible to significantly reduce image artifacts by comparison with a reconstruction of the result image data set exclusively from the two-dimensional images without utilizing an algorithm for reducing artifacts.

Utilization of the artifact-reduced image data set in the course of reconstruction is possible in various ways. For example, the artifact-reduced image data set may be utilized to generate, by forward projection or simulation of the image, artificial two-dimensional images for imaging angles that are outside a restricted angular range. However, it is also possible to utilize the artifact-reduced image data set for the purpose of initializing iterative reconstruction methods, or in the course of iteration with such methods.

The method may additionally include the capture of two-dimensional images of the object undergoing examination. The object undergoing examination may be for example a patient. The images may be captured, for example, in the course of medical imaging. Capture of the images may be performed with the aid of an X-ray detector. A C-arm detector with, for example, a flat-panel detector, may be used. The angular range within which the imaging angles of all the images lie may be, for example, less than the sum of 180° and the fan angle utilized, e.g. less than 200°.

An algorithm that has been or is trained by a machine learning method may be used as the algorithm for reducing artifacts. For example, a neural network may be trained. Supervised learning may be performed, in which learning takes place on the basis of training data sets. The training data sets may include a plurality of setpoint outputs from the algorithm and respective input data. The algorithm may be trained so that an artifact-reduced image data set is generated directly. However, it is also possible—as for example in the publication by J. Gu et al., cited above—for the machine learning algorithm to identify the artifacts that are present in a reconstructed image data set, such that these artifacts may then be removed from the reconstructed image data set, for example by the subtraction of a corresponding data set.

Training data sets for training the algorithm may be provided for example in that for each training data set first of all two-dimensional images are captured or provided over a sufficiently large angular range, for example over an angular range of 200°, to provide substantially artifact-free reconstruction. For example, corresponding two-dimensional images may be obtained from a computed tomograph. All the two-dimensional images may be utilized to generate a reference image data set that may be specified as a setpoint output of the algorithm. Then, any two-dimensional images that lie outside the restricted angular range may be discarded in order, using a reconstruction that only takes into account input data from the restricted angular range, to generate input data for the respective training data set.

As the processing result of processing the two-dimensional images, it is possible to reconstruct a provisional three-dimensional image data set that is further processed by the algorithm for reducing artifacts to provide the artifact-reduced image data set. The provisional image data set may be generated, for example, by filtered back projection of the two-dimensional images. However, it is also possible to use more complex reconstruction methods, such as iterative reconstruction methods.

For the purpose of reconstructing the result image data set, an iterative reconstruction method may be used. An assumed image data set is varied at each iteration step in dependence on the images of the object undergoing examination. A detailed discussion of iterative reconstruction methods and their utilization in the field of compressed sensing may be found for example in the publication by G.-H. Chen et al., "Prior Image constrained compressed sensing (PICCS): A method to accurately reconstruct dynamic CT Images from highly undersampled projection data sets", Med. Phys. 35 (2), p. 660, February 2008.

Iterative reconstruction methods utilize that, in the field of medical imaging, reconstructed image data sets are typically sparsely populated, or can be transformed into sparsely populated data sets by corresponding transforms, for example by a discrete gradient transform or a wavelet transform. This allows reconstruction of considerably better quality to be obtained with a small number of input data points—for example even if images are only present for a restricted angular range. Moreover, iterative reconstruction methods are well suited to utilizing prior knowledge in the form of an artifact-reduced image data set.

The rate of processing and potentially also the result of iterative reconstruction methods may be significantly improved if, at the start of the iteration, the assumed image data set is initialized such that the data set is already as similar as possible to the result image data set. It is thus known to initialize iteration-based reconstruction methods using an image data set that is generated by a less complex reconstruction method, for example an image data set generated by filtered back projection. However, because, when a restricted angular range is utilized for capturing the two-dimensional images, the image data set may be severely affected by artifacts, when iterative reconstruction methods are used, the result is similarly severe artifacts in the finally reconstructed image data set.

The artifact-reduced image data set may be used as the assumed image data set in the first iteration step. This modification to the reconstruction of the result image data already makes it possible largely to avoid, or at least significantly to reduce, artifacts in the result image data set, by comparison with conventional iterative reconstruction methods.

In addition, or as an alternative, however, the iteration method may also be improved. The sparser a reconstructed data set, the better the reconstruction results delivered by iterative reconstruction methods. As discussed above, and as described in detail in the publication by G.-H. Chen et al. cited above, a reconstruction may thus be improved by using sparsifying transforms to optimize not the assumed image data set but an image data set that has been made sparser. For this purpose, it is not necessary to calculate the sparsified image data set explicitly, but rather it is sufficient to adapt correspondingly a cost function that has been utilized in the course of optimization. Because it is expected that the artifact-reduced image data set will be very similar to the result image data set, at least in respect of large parts of the image data set, the artifact-reduced image data set may be utilized to perform effectively an iteration on a data set that has been further sparsified.

In the course of the iterations it is possible to minimize a cost function. The minimization takes place, for example, with at least one boundary condition, the cost function depending on the assumed image data set and the artifact-reduced image data set. For example, the cost function may depend on difference data determined by subtracting the data of the assumed image data set and the artifact-reduced image data set from one another. In the course of the iteration, it is thus possible to minimize the following function, or a cost function that includes the following function as a summand:

$$\alpha \cdot |S_1(X-X_{ar})| + (1-\alpha) \cdot |S_2 X| \qquad (1)$$

where X is the assumed image data set and $X_{ar}$ is the artifact-reduced image data set. The parentheses in the first term thus describes the difference data. $S_1$ and $S_2$ are respectively sparsifying transforms—that is, functions or operations that make the data more sparse. The same transform may also be utilized for $S_1$ and $S_2$. For example, a discrete gradient transform may be utilized. $\alpha$ is a weighting factor that specifies the extent to which the artifact-reduced image data set is to be used in the course of the iteration. If $\alpha$ were equal to 0, a conventional iterative reconstruction would be performed without taking into account the artifact-reduced image data set. In order to stabilize the method in relation to possible artifacts in the artifact-reduced image data set, $\alpha$ may be selected to be <1. However, $\alpha$ could be equal to 1. In an example, $\alpha$ is greater than 0.5, greater than 0.7 or greater than 0.9.

As the boundary condition in the course of iteration, the fact that with an image of the respective assumed image data set the two-dimensional images that were actually captured are the result is taken into account. The modification to the assumed image data set in the iteration steps is performed in each case such that the boundary condition is fulfilled. The boundary condition may be expressed as follows:

$$A_i X = Y_i \quad (2)$$

where $Y_i$ is the $i^{th}$ two-dimensional image, and $A_i$ is an imaging rule—for example, an imaging matrix—for the respective image $Y_i$. Since only images from a restricted angular range are present, the boundary condition results in an underdetermined equation system, so the boundary condition may be used as a hard boundary condition. As an alternative, however, it would also be possible to take the boundary condition into account in the context of a cost function, for example in that the cost function includes the difference between the two sides of the equation multiplied by a weighting factor.

As an alternative, for the purpose of reconstructing the result image data set, it is possible to use filtered back projection. This may be advantageous, since a reconstruction by filtered back projection is considerably less processing-intensive than an iterative reconstruction. For example, it may be desired to provide the result image data set, or for example section planes of the result image data set, with a very brief delay—for example, in real time—if the method is utilized to provide result image data sets in the context of monitoring a patient in tandem with a medical procedure. By utilizing prior knowledge in the form of the artifact-reduced image data set, it is also possible, during reconstruction of the result image data set by filtered back projection, to significantly reduce or largely avoid artifacts arising from a restricted angular range. For example, missing images outside the restricted angular range may be generated synthetically.

For at least one imaging angle lying outside the restricted angular range, a synthetic two-dimensional image may be generated by simulating an image of the artifact-reduced image data set. The result image data set is reconstructed in dependence on the synthetic image. In one case, imaging may be carried out by forward projection of the artifact-reduced image data set. In addition, however, further properties of the image, for example properties of a capture device that is used, or similar, may be taken into account in the context of the simulation. Multiple methods may be used for the simulation of for example two-dimensional X-ray data using three-dimensional image data sets.

In addition to the method embodiments provide a processing device for processing two-dimensional image that is configured to perform the method described above. The processing device may include a storage device that may store a program for performing the method and/or the data utilized in the course of the method. The processing device may also include a processor that may perform the method steps. The processing device may be part of an medical imaging device, or be associated therewith.

The processing device may also be a server that may be arranged on the same premises as an imaging device or indeed remote therefrom. The processing device may also be implemented in the cloud, for example, by multiple computer systems that are accessible over a network.

Embodiments may also provide a computer program that may be loaded directly into a memory of a processing device, having programming to perform the steps of the method when the program is executed in the processing device.

Embodiments also provide an electronically readable data medium with, stored thereon, electronically readable control information that includes at least one computer program and takes a form such that the program performs the method when the data medium is used in a processing device.

Embodiments also provide an X-ray device including an image capturing device for capturing two-dimensional images of an object undergoing examination, e.g. X-ray images, from a plurality of imaging angles. The X-ray device includes a processing device. The X-ray device may be a computed tomography device or a C-arm device. The X-ray device may include an output device, or provide data to an output device, to display sectional images or other representations determined from the result image data set. The X-ray device may include an X-ray source and an X-ray detector that may be rotated around the object undergoing examination, for example a patient lying on a patient table. During the examination, an angle of rotation may be restricted because of the structure of the X-ray device or a use situation, with the result that imaged information or X-ray images may only be captured in a restricted angular range.

DETAILED DESCRIPTION

Figure 1:
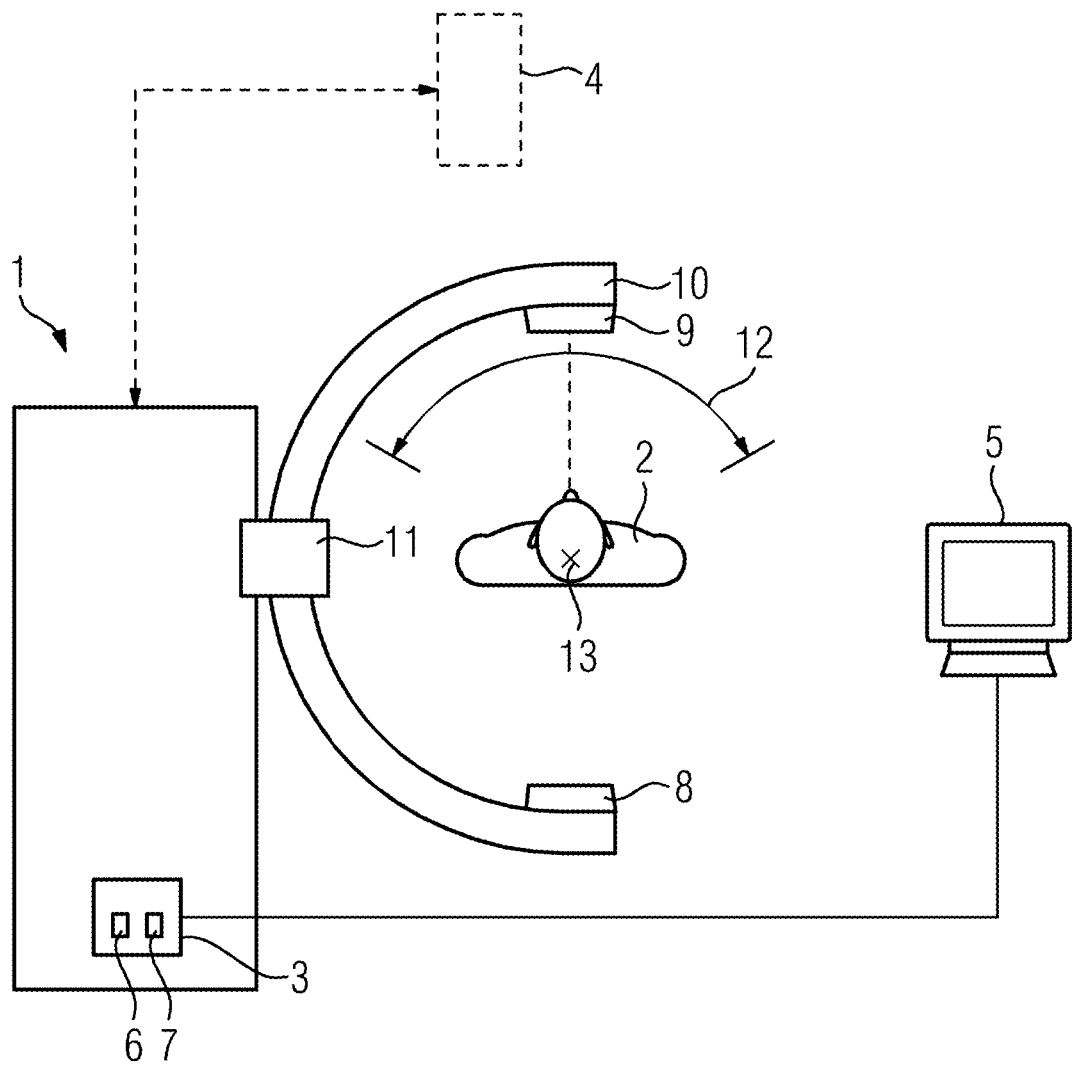
FIG. 1 depicts an example of an X-ray device according to an embodiment that includes a processing device.

FIG. 1 depicts an X-ray device 1 that, in the example shown, is a C-arm X-ray device. The X-ray device 1 serves to capture a plurality of two-dimensional images of an object undergoing examination 2, e.g. a patient. Using an internal or external processing device 3, 4 it is possible to reconstruct from the two-dimensional images a three-dimensional result image data set, for example to display sectional images of the object undergoing examination on a display device 5, or to use this data in another way. The processing devices 3, 4 each include a storage device 6 that serves to store the two-dimensional images and the three-dimensional result image data set and other data arising in the course of reconstruction. Moreover, the storage device may store a computer program that, when executed by the processor 7 of the processing device 3, performs a method for reconstructing the three-dimensional result image data set from the two-dimensional images.

The X-ray device includes an image capturing device 8, e.g. an X-ray detector, and an X-ray source 9. The image capturing device 8 and the X-ray source 9 are mounted on a C-arm 10, as a result of which the image capturing device 8 and the X-ray source 9 may be pivoted by an actuator 11 about the axis 13 through a restricted angular range 12. If the processing devices 3, 4 were to reconstruct the two-dimensional images into three-dimensional result image data sets directly using conventional reconstruction methods such as filtered back projection or iterative methods, then because of the restricted angular range 12 there would be significant levels of artifacts in the result image data set that may make it significantly more difficult to interpret the result image data set or sectional images generated therefrom.

For this reason, the processing devices 3, 4 perform a reconstruction method in which a three-dimensional artifact-reduced image data set is provided in dependence on the two-dimensional images. In the course of providing the artifact-reduced image data set, the two-dimensional images, or a processing result dependent on the two-dimensional images, are processed by an algorithm for reducing artifacts resulting from the restriction on the angular range 12. The algorithm for reducing artifacts may be trained by a machine learning method.

The result image data set is then reconstructed by a reconstruction algorithm that processes both the artifact-reduced image data set, or processing data generated therefrom, and also the two-dimensional images as input data. The fact that both an artifact-reduced image data set and also the two-dimensional images are taken into account in the context of the reconstruction makes it possible to significantly reduce or to almost completely avoid artifacts caused by the restricted angular range 12. It is also possible at the same time for a loss of information from the result image data set resulting from the reduction of artifacts—for example an inadvertent removal of anatomical structures such as a lesion—to be avoided.

As depicted in FIG. 1, depending on the concrete application an internal processing device 3 or an external processing device 4 may be used. Utilization of an internal processing device 3 is advantageous if information determined directly by the X-ray device from the three-dimensional result data set is to be output. This may be favorable for example if information is to be output almost in real time, for example if the imaging is to be used in tandem with a medical procedure. An external processing device may be advantageous if the reconstruction is less time-critical, for example if the three-dimensional result data set is only to be evaluated later. In this case, processing may be performed for example by a cloud-based service or an external server. However, it is also possible to arrange an external processing device 4 in the same room or at least the same building as the X-ray device 1. For example, a workstation of a doctor or another medical specialist may be utilized as the processing device 4.

Figure 2:
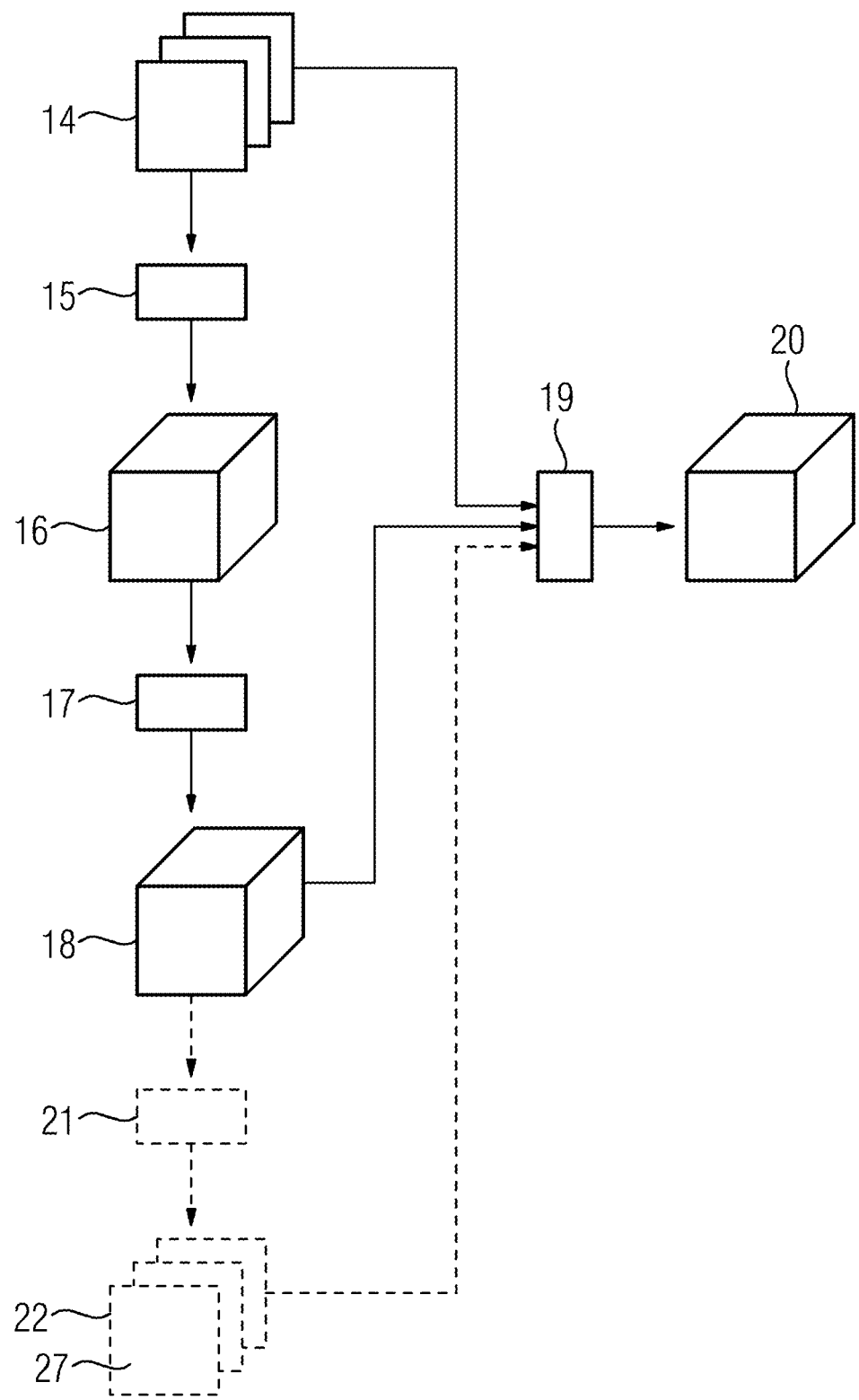
FIG. 2 depicts the processing of two-dimensional images to give a result image data set according to an embodiment.
Figure 3:
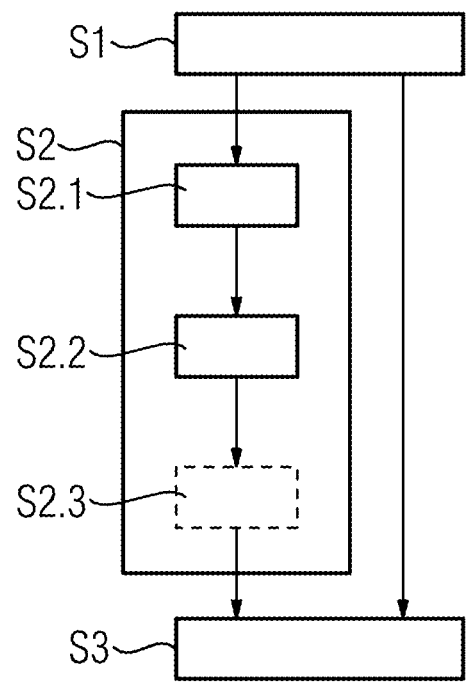
FIG. 3 depicts a flow diagram of an embodiment of a method for reconstructing a three-dimensional result image data set.

FIG. 2 depicts schematically the reconstruction of a three-dimensional result image data set 20 from the two-dimensional images 14 captured in the restricted angular range 12. The reconstruction will be explained below with reference to FIG. 3, that depicts an associated flow diagram of the reconstruction method.

In step S1, two-dimensional images 14 are captured from different imaging angles within the restricted angular range 12. The internal processing device 3 or another controller of the X-ray device 1 may trigger the actuator 11 in order to pivot the C-arm 10 appropriately and then, by actuating the X-ray tube 9 and capturing image data by the image capturing device 8, capture the individual images 14. In an alternative embodiment, the images 14 may be captured by another image capturing device or provided in another way.

In step S2, a three-dimensional artifact-reduced image data set 18 is provided in dependence on the two-dimensional images 14. In the examples discussed, this step may include two or three sub-steps.

In step S2.1, a provisional image data set is reconstructed by a reconstruction module 15, as a processing result 10. This may be done by reconstruction methods. For example, filtered back projection or an iterative reconstruction method may be utilized to reconstruct the provisional image data set from the two-dimensional images 14. Because, in the context of the reconstruction, only two-dimensional images 14 from a restricted angular range 12—for example an angular range of 120° or 150°—are utilized, conventionally the provisional image data set 16 is distorted by severe artifacts.

In step S2.2, the provisional image data set 16 is processed further by an algorithm 17 for reducing artifacts, to provide the artifact-reduced image data set 18. As the algorithm 17 an algorithm is used that has been trained by a machine learning method, for example a neural network or similar. One method of training a corresponding algorithm 17 will be explained below with reference to FIG. 4. For example, as the algorithm 17 an algorithm as discussed in the publication by G.-H. Chen et al. discussed above might be used.

The artifact-reduced image data set 18 and the two-dimensional images 14 may be utilized directly in step S3 as input data of a reconstruction algorithm 19 to reconstruct the three-dimensional result image data set 20. In that case, the additional step 2.3 is not required. This is favorable if an iterative reconstruction method is utilized as the reconstruction algorithm 19. There, in the simplest case, a conventional iterative reconstruction method may be used, but initialization is performed by the artifact-reduced image data set 18. Unlike initialization of an iterative method in a manner conventional in the art, with filtered back projection of the two-dimensional images 14, this already provides a significant reduction in the artifacts remaining in the result image data set 20 as a result of the restricted angular range 12. A further reduction in the artifacts in the result image data set may potentially be achieved in that the artifact-reduced image data set is taken into account in the individual iteration steps of an iterative reconstruction. This will be explained below with reference to FIG. 5.

Although utilization of an iterative reconstruction algorithm as the reconstruction algorithm 19 results in a higher-quality reconstruction of the three-dimensional result image data set, a reconstruction algorithm of this kind is relatively processing-intensive. If only limited processing power is available, a three-dimensional result image data set reconstructed in this way may only be provided with a significant time delay. If only relatively low processing power is to be provided, or if a very rapid provision of the three-dimensional result image data set is desired, it is also possible to use for example filtered back projection as the reconstruction algorithm 19. In this case, it is favorable to preprocess the artifact-reduced image data set 18 first, in step S2.3, before performing step S3, in order to provide processing data 22 generated from the artifact-reduced image data set 18. It is possible to use an imaging simulation module 21 to generate synthetic two-dimensional images 27 for imaging angles lying outside the restricted angular range 12. In one case, this may be done by direct forward projection of the artifact-reduced image data set 18. However, more complex simulations may be utilized that also take into account, for example, properties of the X-ray device 1. Different approaches to the simulation of X-ray imaging on the basis of a three-dimensional image data set may be used.

In the context of the reconstruction algorithm 19, it is possible in step S3 to utilize the two-dimensional images 14 for the restricted angular range and the synthetic images 27 for the region outside the restricted angular range, such that even if filtered back projection is utilized as the reconstruction algorithm the result is a result image data set that is largely free of artifacts.

Figure 4:
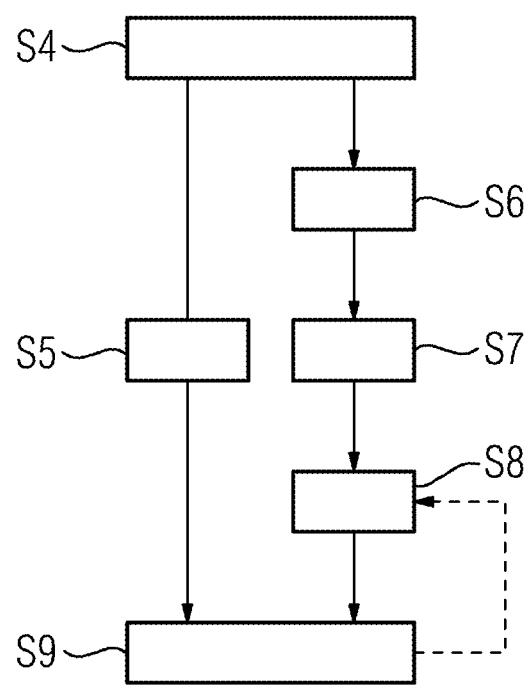
FIG. 4 depicts a flow diagram of an example method for training an algorithm for reducing artifacts that may be utilized according to an embodiment.

FIG. 4 depicts a flow diagram for a method for training the algorithm 17 for reducing artifacts. In step S4, two-dimensional images of reference objects are captured. For example, a computed tomograph may be utilized to capture two-dimensional images over a large angular range, for example an angular range of 360°, such that reconstruction of a result image data set that is substantially free of artifacts is possible from the captured two-dimensional images. In steps S5 to S7, a respective training data set is generated from each group of two-dimensional images for the imaging procedure. In step S5 a reconstruction is performed on the basis of all the two-dimensional images captured in step S4 to generate a reference image data set that is substantially free of artifacts. In step S6, in parallel with this, the two-dimensional images that lie outside a restricted angular range for which the algorithm 17 is to be trained are discarded. In step S7, a reconstruction of an input image data set is performed from the remaining two-dimensional images within the restricted angular range.

Using the training data sets that were generated in steps S4 to S7, in steps S8 and S9 training of the algorithm 17 is performed. In step S8 the algorithm 17 is applied to a respective input image data set determined in step S7, and in step S9 the result of the algorithm 17 is compared with the reference image data set that was generated in step S5. Depending on the comparison, parameterization of the algorithm 17 is adapted—for example by minimizing a cost function, that may be achieved for example by a gradient descent method or error backpropagation. The procedure is repeated iteratively for different training data sets until a sufficient level of training of the algorithm 17 has been reached.

Figure 5:
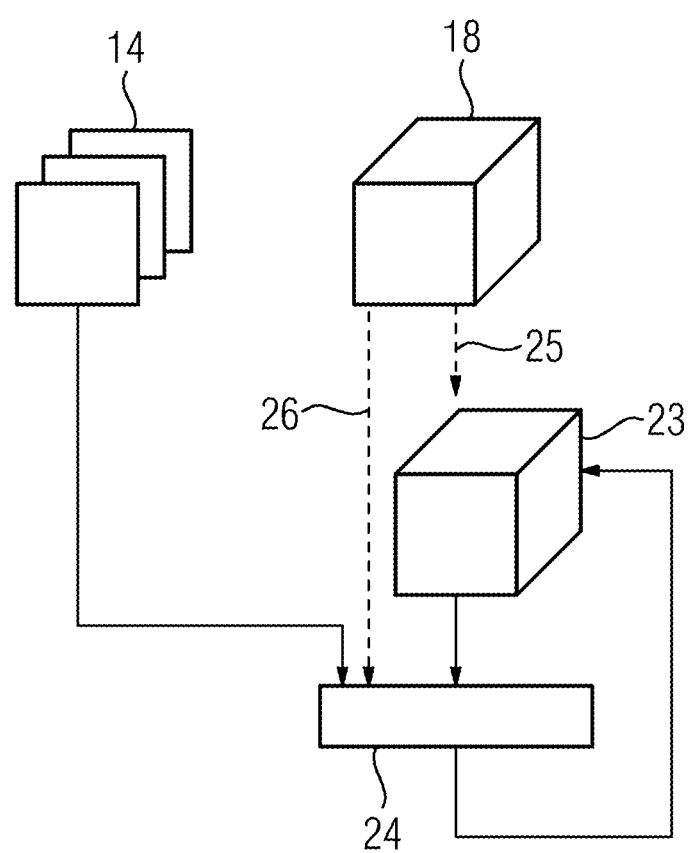
FIG. 5 depicts an example iterative reconstruction of a result image data set according to an embodiment.

FIG. 5 depicts schematically how an iterative reconstruction method that may be utilized as the reconstruction method 19 in FIG. 2 is performed. In iterative reconstruction methods, an assumed image data set 23 is varied at each iteration step by a variation module 24. The variation is performed in dependence on the assumed image data set 23 and the images 14 of the object undergoing examination 2. With conventional iteration methods, in this case a transform—for example a discrete gradient transform—is applied to the assumed image data set 23, and the assumed image data set 23 is varied to result in a transformed data set that is as sparse as possible. This corresponds to application of the function discussed above:

$$\alpha \cdot |S_1(X - X_{a})| + (1-\alpha) \cdot |S_2 X| \quad (1)$$

as the cost function with the parameter $\alpha$ set to zero.

As already discussed above in relation to the above-mentioned equation, the variation may be made with the boundary condition such that corresponding images of the assumed image data set 23 correspond to the actual images 14 of the object undergoing examination. This may be used as a hard boundary condition but also as a soft boundary condition, for example if a measure of the deviation of the images of the assumed data set 23 from the respective images 14 is taken into account in a cost function that is minimized.

For the purpose of taking into account the artifact-reduced image data set 18 in the context of reconstruction, two approaches are presented schematically in FIG. 5. One modification of the iteration method described is to utilize the artifact-reduced image data set 18 as the assumed image data set 23 in the first iteration step—as represented by the arrow 25. As a result of the artifact reduction, it is expected here that images of the artifact-reduced image data set 18 will deviate at least slightly from the corresponding images 14 of the object undergoing examination. The deviation is reduced or eliminated in the course of iteration by the boundary condition, explained above, of varying the assumed image data set 23. At the same time, reduction of the artifacts is at least largely retained.

In addition, or as an alternative, however, the artifact-reduced image data set—as represented by the arrow 26—may also be taken into account in the context of the variation in the variation module 24. This is done if the parameter $\alpha$ in the equation (1) above is set to a value not equal to zero. The three-dimensional result image data set 20 that is actually to be generated is predicted to be highly similar to the artifact-reduced image data set 18, with the result that it is possible to improve sparsification of the transformed data set and thus also the quality of the iterative reconstruction by taking into account difference data that is determined by subtracting the data of the assumed image data set 23 and the artifact-reduced image data set 18 from one another.

As explained above, the described methods for reconstructing the result image data set 20 may be implemented by a computer program. This may be stored for example by an electronically readable data medium (not illustrated) that stores it in permanently.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for reconstructing a three-dimensional result image data set from computed tomography from a plurality of two-dimensional images that create an image of an object undergoing examination from a particular imaging angle, the method comprising:
   providing a three-dimensional artifact-reduced image data set as a function of the plurality of two-dimensional images, wherein the plurality of two-dimensional images or a processing result that is dependent on the plurality of two-dimensional images are processed by an algorithm for reducing artifacts; and
   reconstructing the three-dimensional result image data set using a reconstruction algorithm that processes using as input data both the three-dimensional artifact-reduced image data set and the plurality of two-dimensional images.

2. The method of claim 1, wherein imaging angles of all the plurality of two-dimensional images lie within a restricted angular range, and in that the plurality of two-dimensional images or the processing result are processed by the algorithm for reducing artifacts resulting from a restriction on an angular range.

3. The method of claim 1, wherein the algorithm for reducing artifacts is an algorithm that has been or is trained by a machine learning method.

4. The method of claim 1, wherein the processing result of processing the plurality of two-dimensional images includes a reconstructed provisional three-dimensional image data set that is further processed by the algorithm for reducing artifacts to provide the artifact-reduced image data set.

5. The method of claim 1, wherein for reconstructing the result image data set, an iterative reconstruction method is used, wherein an assumed image data set is varied at each iteration step in dependence on images of the object undergoing examination.

6. The method of claim 5 wherein in a first iteration step of the iterative reconstruction method, the artifact-reduced image data set is used as the assumed image data set.

7. The method of claim 5, wherein a cost function is minimized during the iterative reconstruction method, wherein the minimization takes place with at least one boundary condition, the cost function depending on the assumed image data set and the artifact-reduced image data set.

8. The method of claim 7, wherein the cost function depends on difference data determined by subtracting data of the assumed image data set and the artifact-reduced image data set from one another.

9. The method of claim 1, wherein for reconstructing the result image data set, filtered back projection is used.

10. The method of claim 2, wherein for at least one imaging angle lying outside the restricted angular range, a synthetic two-dimensional image is generated by simulating an image of the artifact-reduced image data set, wherein the result image data set is reconstructed as a function of the synthetic image two-dimensional image.

11. A method for reconstructing a three-dimensional result image data set, the method comprising:
  acquiring a plurality of two-dimensional images of an object undergoing examination from a particular imaging angle;
  generating, using an algorithm for reducing artifacts, a three-dimensional artifact-reduced image data set as a function of the plurality of two-dimensional images; and
  reconstructing the three-dimensional result image data set, using a reconstruction algorithm, from both the three-dimensional artifact-reduced image data set and the plurality of two-dimensional images.

12. An X-ray system comprising:
  an image capturing device configured to capture two-dimensional images of an object undergoing examination from a plurality of imaging angles; and
  a processing device configured to generate a three-dimensional artifact-reduced image data set as a function of the two-dimensional images processed by an algorithm for reducing artifacts and reconstruct a three-dimensional result image data set using a reconstruction algorithm that processes both the artifact-reduced image data set or processing data that is generated from the artifact-reduced image data set and the two-dimensional images as input data.

13. The X-ray system of claim 12, wherein the plurality of imaging angles of all the two-dimensional images lie within a restricted angular range, and in that the two-dimensional images are processed by the algorithm for reducing artifacts resulting from a restriction on an angular range.

14. The X-ray system of claim 12, wherein the algorithm for reducing artifacts is an algorithm that has been or is trained by a machine learning method.

15. The X-ray system of claim 12, wherein the processing device is configured to reconstruct the three-dimensional result image data set using an iterative reconstruction method, wherein an assumed image data set is varied at each iteration step in dependence on images of the object undergoing examination.

16. The X-ray system of claim 15, wherein in a first iteration step, the artifact-reduced image data set is used as the assumed image data set.

17. The X-ray system of claim 15, wherein a cost function is minimized during the iterative reconstruction method, wherein the minimization takes place with at least one boundary condition, the cost function depending on the assumed image data set and the artifact-reduced image data set.

18. The X-ray system of claim 17, wherein the cost function depends on difference data determined by subtracting data of the assumed image data set and the artifact-reduced image data set from one another.

19. The X-ray system of claim 12, wherein the processing device is configured to reconstruct the three-dimensional result image data set using filtered back projection.

20. The X-ray system of claim 12, wherein for at least one imaging angle lying outside the restricted angular range, a synthetic two-dimensional image is generated by the processing device by simulating an image of the artifact-reduced image data set, wherein the three-dimensional result image data set is reconstructed by the processing device in dependence on the synthetic image two-dimensional image.

* * * * *